Figure 8:
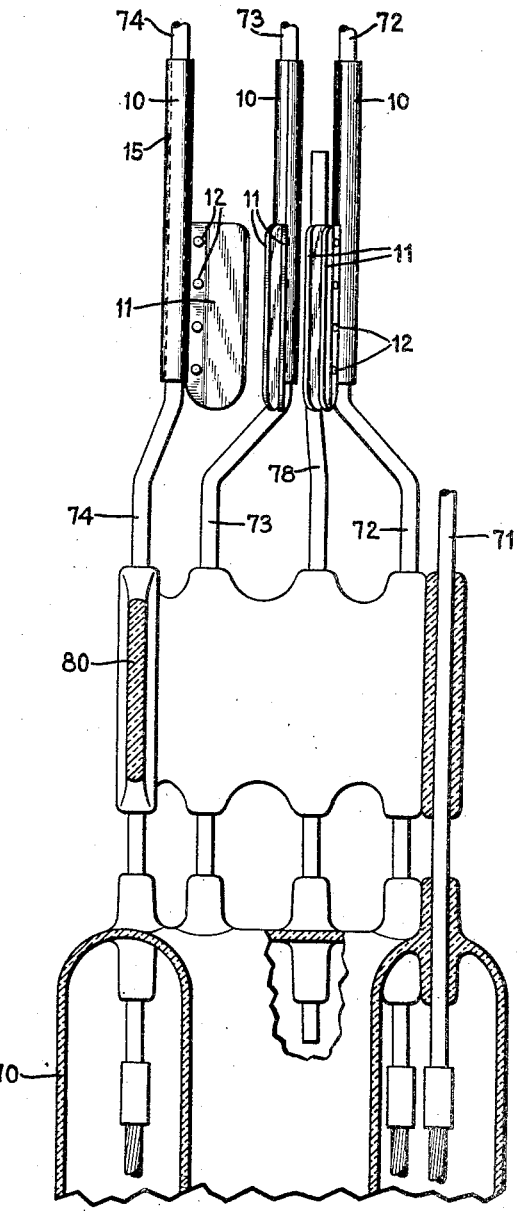

Jan. 28, 1941.  L. C. GOODALE  2,229,734
METHOD AND MEANS OF HEAT PROTECTION FOR METAL-TO-GLASS SEALS
Filed June 8, 1940  2 Sheets-Sheet 1
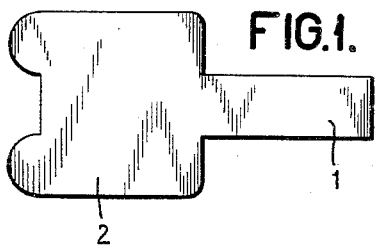
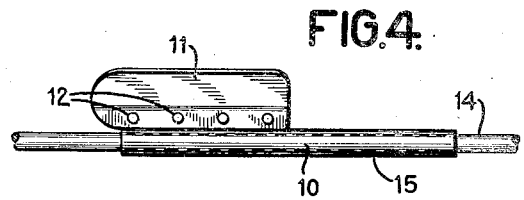
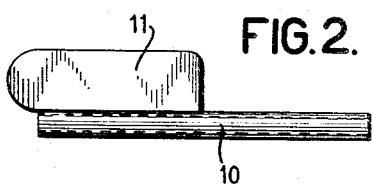
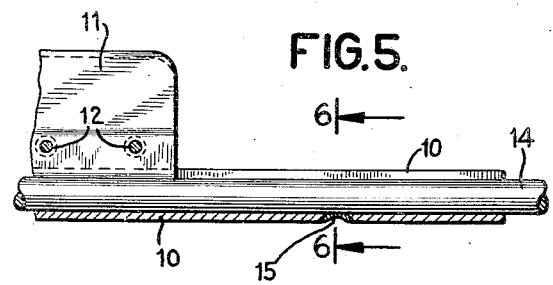
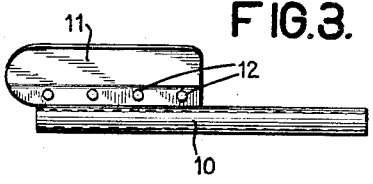
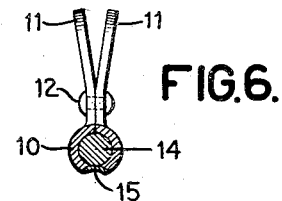
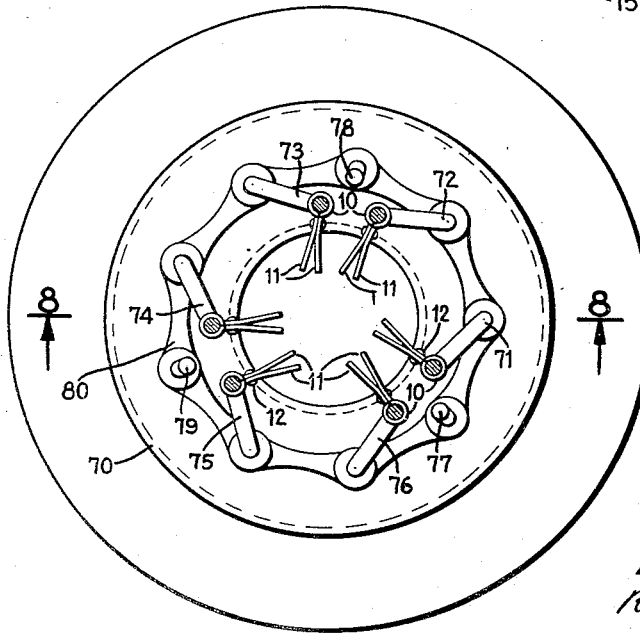
INVENTOR.
LYNN C. GOODALE
RC Hopgood
ATTORNEY.

Jan. 28, 1941. L. C. GOODALE 2,229,734
METHOD AND MEANS OF HEAT PROTECTION FOR METAL-TO-GLASS SEALS
Filed June 8, 1940 2 Sheets-Sheet 2

INVENTOR.
LYNN C. GOODALE
BY
R C Hopgood
ATTORNEY.

Patented Jan. 28, 1941

2,229,734

UNITED STATES PATENT OFFICE 2,229,734

METHOD AND MEANS OF HEAT PROTECTION FOR METAL-TO-GLASS SEALS

Lynn C. Goodale, Newark, N. J., assignor to Federal Telegraph Company, Newark, N. J., a corporation of California Application June 8, 1940, Serial No. 339,481

8 Claims. (Cl. 250—27.5)

This invention relates to methods and means for protecting metal to glass seals from heat conducted from the electrodes to the seals along the electrode supporting rods.

This problem is of great importance in power tube design since in said tubes a great deal of heat is generated, and the failure of the metal to glass seals is frequently the cause of tube failure.

One form of protection commonly used is the heat shield which serves to deflect radiation heat away from the seal. These heat shields, however, do not protect the seal in any way from the heat conducted along the electrode supporting rods.

According to my invention I provide heat radiating fins fitted to said rods and integrally bonded thereto, preferably by welding, for radiating the conducted heat before it reaches the glass seal.

Difficulty is encountered in attempting to weld the metal fins or vanes to the supporting rods, since these rods particularly when made of tungsten as in most vacuum tubes, tend to warp or bend under the welding operation. In accordance with my invention I overcome this difficulty by supporting the radiating fin on a sleeve, which embraces a relatively long portion of the rod, fitting the sleeve snugly over the rod and thereafter spot welding the sleeve to the rod. This process avoids warping of the rods, presumably because the heat generated during the welding process is distributed evenly along the rod. This avoidance of warping is a very important practical problem in vacuum tube construction.

It is an object of my invention to provide a method of welding a metal sleeve to a rod without distorting the rod during the welding operation.

It is a further object of my invention to provide a method and means for protecting the seal in a vacuum tube from heat conducted over a metal electrode supporting rod.

A better understanding of my invention, as well as other objects and features thereof may be had from the particular description of a preferred embodiment thereof made in connection with the accompanying drawings, in which Figs. 1 to 6, inclusive, illustrate the successive steps in providing a cooling fin welded to a rod, and Figs. 7 and 8 show in plan and sectional view, respectively, an electrode supporting stem in accordance with my invention.

In Fig. 1 is illustrated a metal blank suitable for forming into a cooling fin for use on any electrode supporting rods. This blank is prepared from any suitable metal, such as molybdenum. At 1 the blank is made relatively narrow so that the width of the blank is approximately equal to the circumference of the rod to which it is to be applied. At the other end 2 the blank is made much wider. The blank is then bent into a cylindrical form as shown in Fig. 2 with one portion of it forming a substantially cylindrical sleeve 10, while the wide portion thereof forms two faces as indicated at 11, contiguous one to the other. The formed blank is then preferably fastened together by means such as rivets 12, shown in Fig. 3. The riveting of the blank at this point, just above the cylindrical portion tends to cause the faces 10 to diverge from one another, as can be more clearly seen in Fig. 6.

The sleeve formed by the blank is so dimensioned that it fits snugly over the electrode supporting rod 14, as shown in Fig. 4. The sleeve and rod are then welded together at one or more points as shown at 15, Fig. 4. Figs. 5 and 6 show enlarged sectional longitudinal and transverse sectional views of the cooling fins as applied to the rods to more clearly show the structure.

The supports are made of suitable material such as tungsten or molybdenum. If desired, the metal forming the cooling fins may be subjected to sand blasting to increase the radiation effect thereof.

Figs. 7 and 8 show in a plan view and a cross-sectional view, respectively, a vacuum tube electrode supporting stem embodying cooling vanes in accordance with the principles of my invention. A portion of vacuum tube envelopes is shown at 70 through which a plurality of filament electrode supporting rods 71 to 76, inclusive, are sealed. Other rods 77, 78 and 79 are provided for supporting additional electrodes or for other auxiliary supporting functions. If desired, the electrode supporting rods and the other rods may be further braced by means of a glass truss or ring 80.

In order to protect the glass seal from heat conducted down rods 71 to 76, each of these rods is provided with a radiating fin assembly similar to that described in connection with Figs. 1 to 6, inclusive. These radiating fins 11 are each mounted on a separate sleeve 10 and are spot welded at one or more points as indicated at 14, Fig. 8, to the corresponding electrode supporting rod.

Preferably, the spot welds are located at points intermediate the ends of the sleeve since by applying the welding heat at this point less danger of causing too severe a local heating of the supporting rod is encountered. It can be seen that heat generated in the electrode will be conducted down rods 71 to 76 to the radiating fins. Because of the intimate contacts between the supporting rods and the sleeves the heat will be readily conducted into the radiating fins and will thus be dissipated before reaching the metal to glass seal. Accordingly, the danger of damage to the tube by excess heating is greatly reduced. It is, of course, possible to use in combination with these cooling fins a heat shield to prevent radiated heat from reaching the glass seal if desired. However, it is generally found unnecessary to add a heat shield since the radiating fins may be spaced a considerable distance above the glass seal and therefore dissipate a large portion of the heat before danger of damage to the tube is encountered.

While I have described above a preferred embodiment of my invention, it should be distinctly understood that this is merely by way of illustration. The principles of my invention may be applied to arrangements for accomplishing a weld between a metal such as tungsten and a sleeve regardless of the particular application thereof. Furthermore, the general principles of utilizing cooling fins for protecting the vacuum tube seal from heat is considered to be a novel and patentable part of my invention.

What I consider as my invention and desire to obtain protection upon is embodied in the accompanying claims.

What I claim is:

1. The method of welding a metal sleeve to an electrode supporting rod without causing distortion of said rod during the welding process, which comprises fitting snugly around said rod a sleeve embracing a relatively long portion of said rod, and thereafter spot welding said sleeve and rod.

2. The method of welding a metal sleeve to an electrode supporting rod without causing distortion of said rod during the welding process, which comprises fitting snugly around said rod a sleeve embracing a relatively long portion of said rod, and thereafter spot welding said sleeve and rod at a point intermediate the ends of said sleeve.

3. The method of mounting a cooling fin on an electrode supporting rod which comprises, fitting a metal sleeve carrying cooling fins snugly around said rod, said sleeve embracing a relatively long portion of said rod and spot welding said sleeve to said rod.

4. The method of mounting cooling fins on an electrode supporting rod which comprises providing a blank of metal sufficiently long to embrace a relatively long portion of said rod and having at least a portion greater than the circumference of said rod, bending said blank to form a sleeve having two oppositely facing surfaces from said portion, fastening said oppositely facing portions together, fitting said sleeve snugly over said rod and thereafter spot welding said rod and said metal blank.

5. The method of protecting vacuum tube seals from heat conducted along metallic electrode supports passing through said seals, which comprises fitting snugly around each of said leads a sleeve embracing a relatively long portion of said lead and carrying a metallic radiating fin, and spot welding said sleeves with said leads.

6. The method according to claim 5, wherein said sleeve is formed from a metal blank having a portion which is substantially of a width equal to the circumference of said lead, and a portion of greater width, further comprising forming said blank into a sleeve with the portions thereof of greater width extending from one line in facing relation to one another, and fastening together said extending parts to provide a split radiating vane.

7. In a vacuum tube electrode assembly comprising a glass envelope portion, a plurality of metal rods forming electrode supports and means sealing said rods through said glass, a means for protecting said glass seals from heat conducted along said supporting rods comprising heat radiating fins integrally bonded to said rods at a point spaced from said glass seals.

8. In a vacuum tube electrode assembly comprising a glass envelope portion, a plurality of metal rods forming electrode supports and means sealing said rods through said glass, a means for protecting said glass seals from heat conducted along said supporting rods, a metal sleeve carrying a radiating fin snugly fitted around said rod, said sleeve embracing a relatively long portion of said rod and spot welded thereto.

LYNN C. GOODALE.